(No Model.)  W. H. WALKER.  2 Sheets—Sheet 1.
PHOTOGRAPHIC CAMERA.
No. 259,064.  Patented June 6, 1882.
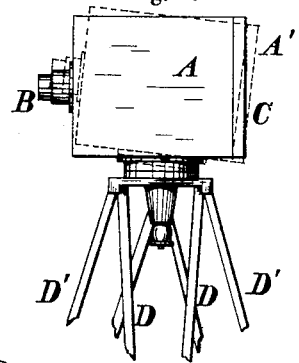
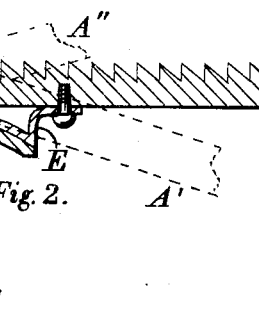
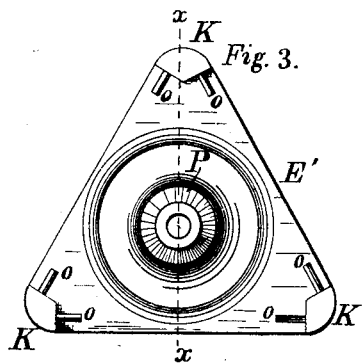
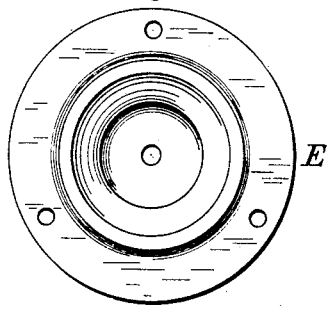
WITNESSES:
H. G. Phillips.
Chas. H. Caldwell.
INVENTOR:
Wm. H. Walker,
by Geo. B. Selden,
Atty.

(No Model.)
W. H. WALKER.
PHOTOGRAPHIC CAMERA.
No. 259,064. Patented June 6, 1882.
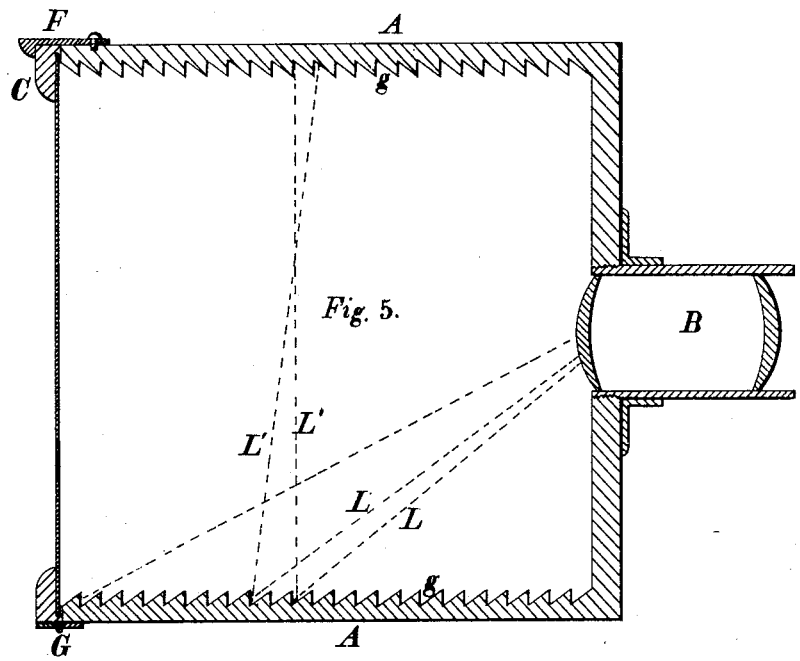
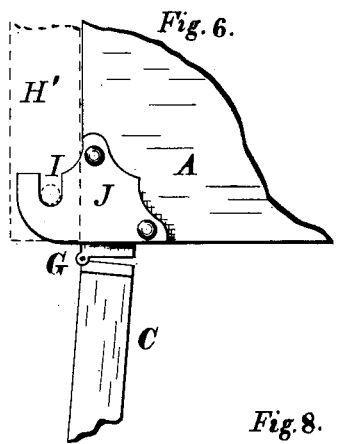
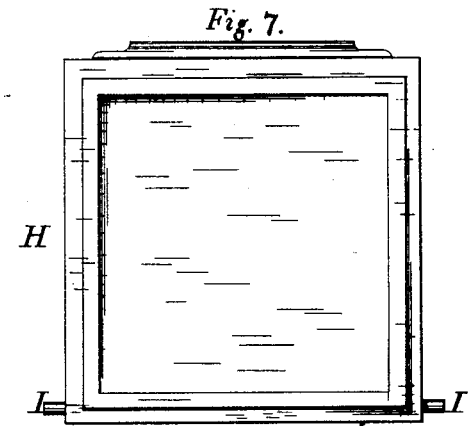
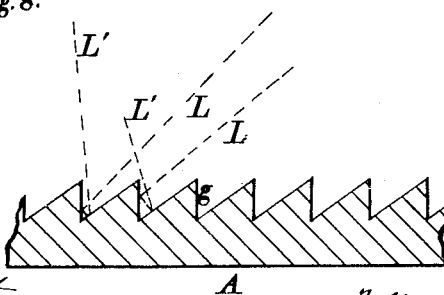
WITNESSES:
H. G. Phillips.
Chas. H. Caldwell.
INVENTOR:
Wm. H. Walker,
by Geo. B. Selden
Atty.
N. PETERS, Photo-Lithographer, Washington, D. C.

UNITED STATES PATENT OFFICE.

WILLIAM H. WALKER, OF ROCHESTER, NEW YORK.

PHOTOGRAPHIC CAMERA.

SPECIFICATION forming part of Letters Patent No. 259,064, dated June 6, 1882.

Application filed February 16, 1882. (No model.)

*To all whom it may concern:*

Be it known that I, WILLIAM H. WALKER, of Rochester, New York, have invented certain Improvements in Photographic Cameras, of which the following is a specification, reference being had to the annexed drawings.

My invention relates to certain improvements in photographic cameras; and it consists in an improved joint by which the camera-body is adjustably secured to the tripod-head.

My invention also consists in improved means for attaching the plate-holder to the camera, and in improved means of preventing reflection of light within the camera.

My invention is illustrated in the accompanying drawings, in which Figure 1 is an elevation of a camera supported on a tripod provided with my improved joint. Fig. 2 is a vertical section through the joint. Fig. 3 is a reversed view of the tripod-head. Fig. 4 shows the upper plate of the joint. Fig. 5 is a vertical section through a camera, showing my improved mode of preventing reflection therein. Fig. 6 is a side view of a portion of the rear of a camera, showing the ground-glass frame turned down and the mode of attaching the holder. Fig. 7 is a rear view of the plate-holder. Fig. 8 is a section through the side of the camera on an enlarged scale.

In the accompanying drawings, A is the body of the camera; B, the lens; C, the ground-glass frame; D D', the legs of the tripod, and E E' the upper and lower plates forming the spherical joint by which the camera is adjustably supported on the tripod.

The camera-body may be of any usual size or shape, provided with a lens and a ground-glass frame, C, which is preferably hinged to the rear end of the body at its lower side, as represented at G, Figs. 5 and 6.

To the bottom of the camera is fastened the flanged plate E, the central portion of which is shaped into a spherical recess, which is fitted to the central convex portion of the lower plate or tripod-head, E.

The tripod-head is triangular in shape, having depending lugs K K K, Fig. 3, into the inner edges of which are inserted the pins *o o*, which enter holes in the upper ends of the tripod-legs when the camera is set up.

A conical tube, P, projects downward from the center of the tripod-head. Through this tube passes the rod *r*, which is screwed or riveted into the center of the upper plate, E', and is provided at its lower end with a thread and thumb-nut, T. The lower end of the tube P is made slightly larger than the rod *r*, so as to permit of the inclination or adjustment of the camera, as indicated by the dotted lines A' A'' in the drawings. A spring, *s*, which is preferably a perforated block of rubber, is introduced between the lower end of the tube P and the nut T.

By the use of my improved joint I am enabled to point the camera in any direction or to adjust it at any angle horizontally without moving the tripod or altering the positions of the tripod-legs. The adjustment is readily made by slacking the thumb-nut T; and after the camera has been pointed in the desired direction it is secured in place by screwing up the nut, compressing the spring *s*, and causing friction between the upper and lower plates constituting the spherical joint.

I attach the plate-holder to the camera by inserting pins I I into its sides near its lower end, which pins project outward from the holder, and when the latter is placed on the camera enter slots or notches cut to receive them in the metallic plates J, fastened to each side of the camera. The upper edge of the holder is secured by any ordinary catch or clip, as shown at F, Fig. 5. The holder, when on the camera, occupies the position of the ground-glass frame C, which is either removed or turned downward on the hinge G, as shown in Fig. 6. By this construction of the parts I am enabled to dispense with the projecting ledge which supports the holder with which cameras are usually supplied, my holder being supported by the projecting plates J J. The ground-glass frame, when in position on the camera, prevents the plates J J from being bent inward by any accidental blow received while being transported.

In order to prevent the reflection of light within the camera in such fashion as to affect the sensitive plate, I construct the sides of my camera of wooden boards provided with grooves running in a direction transverse to the optical axis. These grooves are made with one straight and one inclined side, as shown in the drawings, the object being to cause any rays of light coming from the lens to be reflected across to the opposite side of the camera and to prevent its being reflected toward the sensitive plate. Thus, in Figs. 5 and 8 the rays of light L, striking against the straight or transverse sides of the grooves, are reflected toward the inclined sides, by which they are again reflected to the opposite side of the camera. The entire interior surface of the camera is painted or otherwise colored black, to promote absorption of light as much as possible. The camera-body is made or lined with material in which the grooves are formed before the parts constituting the sides of the camera are fastened together. In this way the cost of making the camera-body is materially reduced. The camera can be made considerably smaller and more portable by the employment of the grooves in its interior, as the reflection of light to the very sensitive plates now in use is prevented by the use of the grooves, whereas if the interior of the camera were left smooth it would be necessary, to prevent fogging the plates, to remove the sides to a greater distance from the optical axis by making the camera of greater dimensions.

I claim—

1. The combination of the hinged focusing-screen frame C and camera-body A, provided with side plates, J J, adapted to retain the holder in place on the camera-body, substantially as described.

2. The combination of the holder H, provided with pins I I, and the camera-body A, having side plates, J J, attached thereto, substantially as described.

3. The combination, with the camera A, provided with concave plate E, of the convex tripod-head E', provided with lugs K, and pins $o$, rod $r$, nut T, and spring $s$, substantially as and for the purposes set forth.

4. The camera-body A, provided with internal light-reflecting grooves, $g\ g$, substantially as and for the purposes set forth.

W. H. WALKER.

Witnesses:
H. G. PHILLIPS,
GEO. B. SELDEN.